United States Patent [19]
Goebel

[11] 3,903,746
[45] Sept. 9, 1975

[54] APPARATUS FOR MEASURING STATIC IMBALANCE OF A MOTOR VEHICLE WHEEL

[75] Inventor: Eickhart Goebel, Pfungstadt, Germany

[73] Assignee: Gebr. Hofmann KG, Darmstadt, Germany

[22] Filed: Sept. 10, 1974

[21] Appl. No.: 504,985

[30] Foreign Application Priority Data
Sept. 12, 1973   Germany............................ 2345992

[52] U.S. Cl. ................................................. 73/457
[51] Int. Cl.² ........................................... G01M 1/28
[58] Field of Search ...................................... 73/457

[56] References Cited
UNITED STATES PATENTS
2,782,641   2/1957   Allen ..................................... 73/457
3,461,729   8/1969   Haynes .................................. 73/457

FOREIGN PATENTS OR APPLICATIONS
951,269   3/1964   United Kingdom................... 73/457

Primary Examiner—James J. Gill
Attorney, Agent, or Firm—Cushman, Darby & Cushman

[57]   ABSTRACT

An apparatus for measuring static imbalance of a motor vehicle wheel without removing the wheel from the vehicle with a base structure, a lever assembly pivotally connected to the base with a brake assembly having frictional members urged into frictional engagement with the lever assembly to arrest movement thereof, and a force measuring device coupled to an axle support in turn mounted on the lever assembly.

14 Claims, 3 Drawing Figures

APPARATUS FOR MEASURING STATIC IMBALANCE OF A MOTOR VEHICLE WHEEL

This invention relates to apparatus for measuring static imbalance in a motor vehicle wheel on a motor vehicle.

In order to avoid removing a motor vehicle wheel from the motor vehicle for testing, imbalance measuring apparatus has been proposed, for measuring imbalance in the wheel while the wheel is still mounted on the motor vehicle. For example, the wheel mounting can be mounted on an electromechanical transducer which is in the form of a force-measuring box, so that static imbalance of the wheel is converted into an electrical voltage. With this apparatus the wheel to be tested is first lifted by a jack and then the measuring stand with the force-measuring box is pushed into position below the wheel mounting; the motor vehicle is then lowered onto a carrier plate of the stand. This means that a number of working steps must be performed before the actual measuring operation can begin.

Another such apparatus is in the form of a high-speed jack which is provided at one end with a force-measuring box. This jack has two carriers which are pivotally interconnected by way of guiding supports in the manner of a parallelogram. This jack however only permits the motor vehicle to be lifted into a single raised position, that is to say, a position in which the two guiding supports are in a vertical position. A disadvantage with this apparatus that it is not possible for all types of motor vehicles to be subjected to the measuring operation, as the jack only provides a single given height of lift.

A further apparatus has been proposed, which uses a hydraulic lifting means or jack. Although this apparatus permits rapid lifting and good positioning of the lifting means, it is not possible to carry out a force measuring operation with a high degree of precision, as the purely hydraulic lifting and support action is not sufficiently rigid, so that it is not possible to effect precise angular measurement of the imbalance. In addition, because of the relatively low ground clearance of passenger vehicles the hydraulic lifting means cannot be readily placed below the part of the vehicle against which the lifting means is to bear.

According to the present invention there is provided apparatus for measuring static imbalance in a wheel mounted on a motor vehicle, with a base structure; means for supporting the base structure on a surface on which in use the apparatus stands; a lever assembly having first and second ends, the first end of the lever assembly being pivotally connected to the base structure; a wheel support assembly pivotally connected to the second end of the lever assembly, for engaging the mounting of the wheel and supporting the wheel in a raised condition; a force-measuring means operatively connected to the support assembly, for detecting static imbalance in the wheel; and actuating means for causing pivotal movement of the lever system relative to the base structure, for raising said support member, whereby force applied to the support assembly by static imbalance in the wheel in the raised condition thereof is transmitted to said support surface by way of the forcemeasuring means, the lever assembly which is arrested relative to the base structure, and the base structure support means.

Apparatus according to the present invention will now be described by way of example with reference to the accompanying drawings in which.

Figure 1:
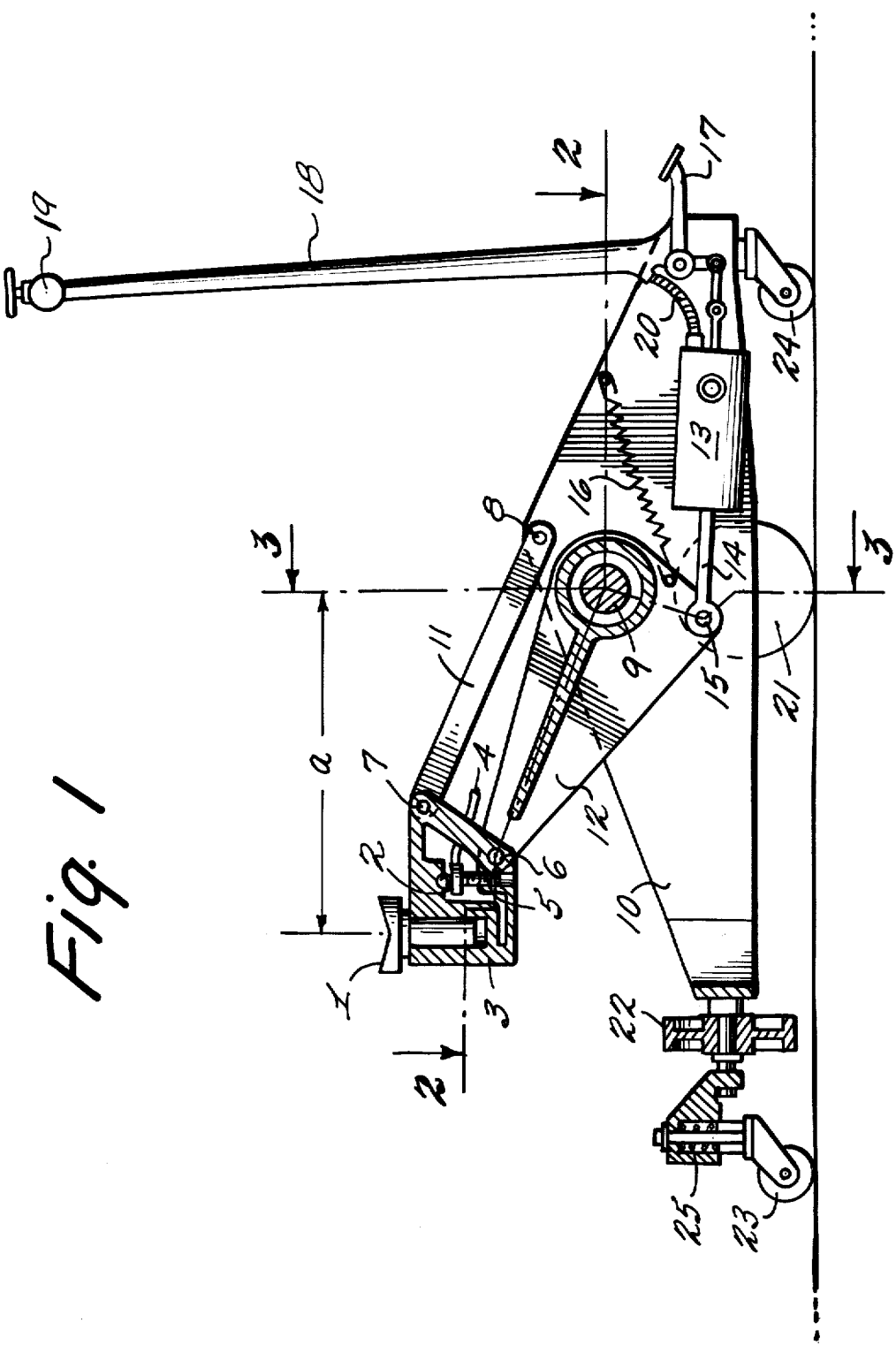
FIG. 1 shows a side view of the apparatus in partial cross section.

Referring firstly to FIG. 1, the apparatus has a prism-shaped support member 1 for supporting a vehicle axle in the vicinity of the wheel mounting of a wheel whose static imbalance is to be determined. The support member 1 is rotatably mounted in a carrier head 3 in order to provide adaptation to the various axles of motor vehicles. A conventional electromechanical transducer 2 which, for example, is a piezo-electric transducer in the form of a force-measuring box or load cell is provided in the carrier head 3. A cable 4 connects the cell 2 to a conventional electronic device (not shown), whereby electrical pulses produced by the cell 2 are conducted to the electronic device which processes the pulses to provide a display of the value of the imbalance measurement operation, as will be described hereinafter. This electronic device is, for example, constructed in accordance with U.K. Pat. No. 1,301,433. A biasing screw 5 is provided for applying an adjustable prestress to the cell 2.

Figure 2:
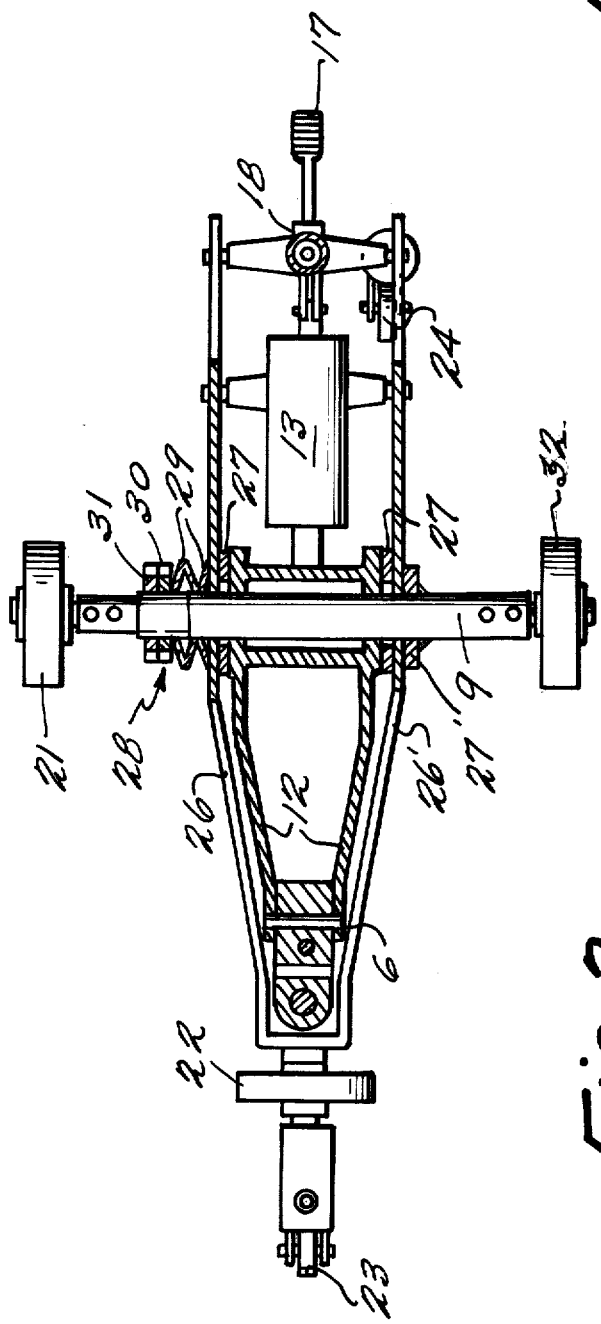
FIG. 2 shows a plan view of the apparatus of FIG. 1 in cross section taken along line A–B in FIG. 1.

The apparatus also have a lever system by means of which a motor vehicle can be lifted for imbalance measurement. The lever system comprises carrier levers 11 and 12 of a substantially triangular shape. As shown in FIG. 2, lever 12 comprises a hub member carried on a spindle or shaft 9, with two side members joined by a transverse web (shown in cross section in FIG. 1). The lever 11 can also be of a similar double-lever construction. The lever 11 is pivotally connected at a rotary axis in the form of a spindle 7 to the carrier lead 3 and at a rotary axis in the form of a spindle 8 to a base frame or structure 10. The lever 12 is pivotally connected at rotary axes in the form of spindles 6 and 9 to the carrier head 3 and the frame 10 respectively. Imaginary lines joining the spindles 7 and 8, 6 and 9 respectively of the two levers 11 and 12 are parallel to each other, and lines joining the respective spindles 6 and 7, 8 and 9 are also parallel to each other, so that the lever system is in the form of a parallelogram lifting assembly. This assembly is actuatable by a lifting means in the form of a hydraulic unit 13. Unit 13 preferably includes a pump and operating cylinder, and an exhaust valve (not shown). A connecting rod 14 of the hydraulic unit 13 is connected to carrier lever 12 pivotally by a spindle 15. The hydraulic unit 13 itself is connected pivotally directly to the base frame 10. A spring 16 is connected to the base frame 10 and the lever 12, for urging the lever 12 towards the position shown in FIG. 1. The action of the spring 16 is assisted by the weight of a motor vehicle supported on the support member, once the exhaust valve of the unit 13 is opened. The speed of lowering of the assembly can be adjusted by a control member in the form of a rotary knob 19 which is provided on a pump lever 18. The knob 19 is operably connected by way of a flexible shaft 20 to the hydraulic unit 13.

Figure 3:
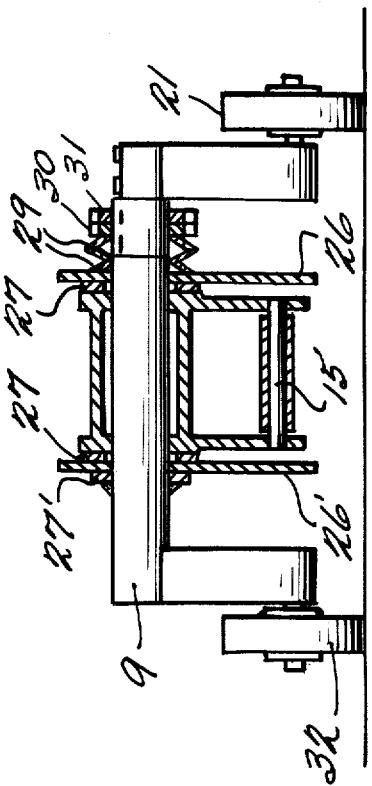
FIG. 3 shows an end view of the apparatus of FIG. 1 in cross section taken along line C–D in FIG. 1.

The hydraulic unit 13 is actuated by a short pump lever 17 for rapid lifting or for lifting small loads, or by the longer pump lever 18 which is used for lifting larger loads. The pump lever 18 can also be used for maneuvering the apparatus and for pushing it into the connect position below the motor vehicle to be lifted. The base frame 10 has three support rollers or wheels 21, 22 and 32 on which the apparatus is supported when the motor vehicle is in a raised condition. As shown in FIG. 2, the support wheels 21 and 32 are arranged parallel to each other and to the longitudinal direction of the base frame 10 while the support wheel 22 is arranged transversely to the longitudinal direction of the base frame 10. As shown in FIGS. 1 and 3, the wheels 21 and 32 are disposed below the spindle 9.

The apparatus has a guide wheels or rollers 23 and 24. The roller 23 is mounted so as to be pivotal about a vertical axis, and also so as to be movable resiliently against the action of a compression spring 25 so that when the apparatus is in an unloaded condition, i.e., it is not supporting any substantial weight at the support member 1, the wheel 22 is lifted from the ground. The roller 24 is also pivotal about a vertical axis but it is so arranged that in the loaded condition of the apparatus, when the wheel 22 is displaced downwardly into contact with the ground on which the apparatus extends, the roller 24 is lifted from the ground.

As mentioned above, the spindle 9, which forms the main rotary axis of the parallelogram lifting assembly, lies above the axis of the two support wheels 21 and 32.

As can be seen from FIG. 3, the wheels 21 and 32 are mounted on stub axles (not referenced) carried on a gantry-like assembly formed by the spindle 9 and two depending arms. It will be apparent from the drawings that the connection at 15 between the lever 12 and the rod 14 lies below the gantry-like assembly.

Referring again to FIGS. 2 and 3, the base frame 10 comprises two side members 26 and 26' which are so constructed as to be rigid in the lifting, i.e., vertical direction, but resiliently flexible in a lateral direction. A friction or brake lining or member 27 is disposed between the lever 12 and each side member 26 and 26'. Fixed, for example, by welding on the spindle 9, at the side of the side member 26' remote from the respective friction member 27, is an abutment plate or disc 27'. Disposed on the spindle 9 outwardly of the side member 26 is a stressing assembly 28 operable to stress the two side members 26 and 26' towards each other, the assembly 28 comprising plate springs 29 held on the spindle 9 between the side member 26 and a nut 30 carried on a screw-threaded portion of the spindle 9. The spindle 9 also carries a lock nut 31 for locking the nut 30 on the spindle 9. The above-described arrangement of components 26, 26', 27, 27', 28 to 31 provide a frictional stabilizing assembly for resisting movement of the lever 12, and thus the whole of the parallelogram lifting assembly 3, 6 to 9, 11 and 12, when the apparatus is holding a motor vehicle in a raised position, to ensure that the support is firm. The lateral force to be applied by the assembly 28, and thus the frictional force as between the side members 26 and 26' and the lever 12, will be sufficiently great that the lifted parallelogram lifting assembly can carry the anticipated maximum of force which is expected to be applied to the apparatus due to imbalance in the motor vehicle wheel supported by the apparatus. It should be noted in this respect that such force produced by the imbalance acts by way of the lever arm of the lever 12 of the parallelogram lifting assembly.

The additional lifting force which is necessary to overcome the frictional force of the friction members 27 is low in comparison with the total lifting force required for raising the motor vehicle, so that this frictional force can be virtually disregarded when using a hydraulic unit 13 with a high degree of operating efficiency. This means that the frictional braking force as between the parallelogram lifting assembly and the base frame 10 can be constantly maintained. Displacement of the nut 30 on the spindle 9 will permit the frictional force to be adjusted if necessary.

The force applied to the support member 1, due to imbalance in the motor vehicle wheel lifted by the apparatus, is transmitted to the ground or the other support surface on which the apparatus is standing, by way of the carrier head 3, the cell 2, the parallelogram lifting assembly, the main axis or spindle 9 and primarily the support wheels 21 and 32 below the spindle 9, although of course the frame 10 is also supported on the wheel 22. It will be noted that the wheel 22 is arranged transversely to the other wheels 21 and 32 in order to allow the apparatus to move as the motor vehicle is lifted; this mobility is required because of the reduction in the effective track of the vehicle during lifting. In other words, as one wheel of the vehicle is raised, a vertical line through the wheel hub will move towards the other wheel on the same axle of the vehicle, due to the inclination assumed by the vehicle during lifting.

The softness or flexibility which is usually found in a hydraulic lifting unit, for example due to air inclusions or soft sealing materials used in the unit, and which is further increased by any lever transmission means connected to the unit, do not have any effect on the firmness of the support member by the above-described apparatus due to the interposition of the frictional force acting as a brake on the parallelogram lifting assembly.

With the above-described apparatus it is thus possible to rapidly and steplessly lift a vehicle to a required height, while the vehicle can be supported rigidly in its raised condition.

What I claim is:

1. Apparatus for measuring static imbalance in a wheel mounted on a motor vehicle, comprising:
   a base structure;
   means for supporting the base structure on a surface on which in use the apparatus stands;
   a lever assembly having first and second ends, the first end of the lever assembly being pivotally connected to the base structure;
   a wheel support assembly, pivotally connected to the second end of the lever assembly, for engaging the mounting of the wheel and supporting the wheel in a raised condition;
   force-measuring means operatively connected to the support assembly, for detecting static imbalance in the wheel; and
   actuating means for causing pivotal movement of the lever assembly relative to the base structure, for raising said support assembly, whereby force applied to the support assembly by static imbalance in the wheel in the raised condition thereof is transmitted to said support surface by way of the forcemeasuring means, the lever assembly which is arrested relative to the base structure, and the base structure support means.

2. Apparatus according to claim 1 wherein the base structure support means includes a pair of wheels and the pivotal axis of the lever assembly on the base structure is also the axis of said pair of wheels.

3. Apparatus according to claim 1 including means for producing a frictional force between the base structure and the lever assembly for arresting the lever assembly relative to the base structure.

4. Apparatus according to claim 3 wherein said frictional force-producing means comprises a brake assembly operatively disposed between the base structure and the lever assembly.

5. Apparatus according to claim 4 wherein the base structure comprises two side members which are at least substantially rigid in the direction of lifting of the apparatus and which are resiliently flexible in a lateral direction, and wherein the brake assembly comprises friction members between the side members and a part of the lever assembly, and biasing means operable to bias the side members and said part of the lever assembly against each to cause frictional engagement with the friction members.

6. Apparatus according to claim 1 wherein the lever assembly is in the form of a parallelogram lifting assembly.

7. Apparatus according to claim 6 wherein the parallelogram lifting assembly comprises first and second levers, one end of each lever being pivotally connected to the base structure and the other end of each lever being pivotally connected to the support assembly.

8. Apparatus according to claim 7 wherein at least one of the levers is of a substantially triangular configuration, one corner of the triangle being connected to the support assembly, a second corner of the triangle being connected to the base structure, and the third corner of the triangle being connected to the actuating means.

9. Apparatus according to claim 8 wherein said actuating means is a hydraulic actuating means.

10. Apparatus according to claim 5 wherein the biasing means includes plate springs.

11. Apparatus according to claim 1 wherein the support means comprises a pair of support wheels arranged parallel to the longitudinal direction of the base structure, and a third support wheel arranged transversely to said direction.

12. Apparatus according to claim 1 further including a plurality of guide wheels or rollers carried by the base structure, one said wheel or roller being mounted resiliently by means of a spring.

13. Apparatus according to claim 9 including a first pump lever for operating the hydraulic actuating means, and a second pump lever for operating the hydraulic actuating means, the second pump lever being longer than the first pump lever.

14. Apparatus according to claim 1 further including means for varying the speeds of lowering of the lever assembly.

* * * * *